United States Patent

Sudmeier

[15] 3,662,563
[45] May 16, 1972

[54] AUTOMOTIVE AIR CONDITIONING SYSTEM UTILIZING SEPARATE CONDENSERS

[72] Inventor: Gustav H. Sudmeier, 2708 Torrance Blvd., Torrance, Calif. 90503

[22] Filed: July 1, 1970

[21] Appl. No.: 51,584

[52] U.S. Cl. ................................62/243, 62/323, 62/506
[51] Int. Cl. ...........................................B60h 3/04
[58] Field of Search................62/241, 243, 244, 323, 506

[56] References Cited

UNITED STATES PATENTS 2,774,220  12/1956  Heym ..................................62/243
3,411,316  11/1968  Wright..................................62/241
3,087,312   4/1963  White...................................62/244

Primary Examiner—Meyer Perlin
Attorney—Nilsson, Robbins, Wills and Berliner

[57] ABSTRACT

An air-conditioning system for automobiles is disclosed, in which a fluid refrigerant is cycled from a compressor, first through primary and secondary condensers, then through an expansion valve and an evaporator, to cool the interior of the automobile. The primary condenser is positioned in the engine compartment and is radially displaced from the engine fan while the secondary condenser is located outside the automobile, e.g. affixed to the undercarriage of the automobile. The compressor is also located in the engine compartment and the evaporator is fixed in the passenger compartment.

2 Claims, 3 Drawing Figures

PATENTED MAY 16 1972 3,662,563

INVENTOR.
GUSTAV H. SUDMEIER
BY
Nilsson, Robbins, Wills & Berliner.
Attorneys.

AUTOMOTIVE AIR CONDITIONING SYSTEM UTILIZING SEPARATE CONDENSERS

BACKGROUND OF THE INVENTION

In recent years, air conditioned automobiles have become increasingly popular and practical. Of course, a number of significant developments have been accomplished in the course of attaining the present state of the automotive air conditioning art. Generally, cycling-refrigerant types of systems have primarily been employed for automotive use. In the conventional system, a compressor is driven by the automotive engine to cycle refrigerant through a condenser and a cooling evaporator that is located in the passenger compartment. Of course, various thermostatic and other forms of control devices have been employed.

In accordance with one automotive air-conditioning arrangement in widespread use, the condenser is mounted in the engine compartment behind the forward grille, and directly in front of the radiator. Although such an arrangement has been widely used, it presents certain difficulties for many vehicles and it is not adaptable for certain types of automobiles. For example, the condenser may heat the stream of air that is directed to cool the engine, to such a degree that the engine operates at excessive temperatures. Accordingly, a need exists for an air conditioning system wherein the condenser component of the system exists in such a manner that the system does not unduly interfere with the operation of the automobile.

In general, in accordance with the present invention, two separate spaced-apart condenser are included, in the form of a primary condenser and a secondary condenser. The primary condenser receives refrigerant directly from the compressor and is mounted in a critical location in the engine compartment, i.e., radially offset from the fan of the engine. The primary condenser supplies somewhat-cooled refrigerant to a secondary condenser which is substantially larger than the primary condenser and which is mounted outside the engine compartment of the automobile. As a result of such an arrangement, an air conditioning system is provided which is effective and efficient in operation yet which does not substantially interfere with the performance of the automobile engine.

BRIEF DESCRIPTION OF THE DRAWINGS

In the drawings which constitute a part of this specification, an exemplary embodiment demonstrating various objectives and features hereof is set forth as follows.

DESCRIPTION OF THE ILLUSTRATIVE EMBODIMENT

As required, a detailed illustrative embodiment of the invention is disclosed herein. However, it is to be understood that the embodiment merely exemplifies the invention which may take many different forms that are radically different from the specific illustrative embodiment disclosed herein. Therefore, specific structural and functional details disclosed herein are not to be interpreted as limiting, but merely as a basis for the claims defining the scope and content of the invention.

Figure 1:
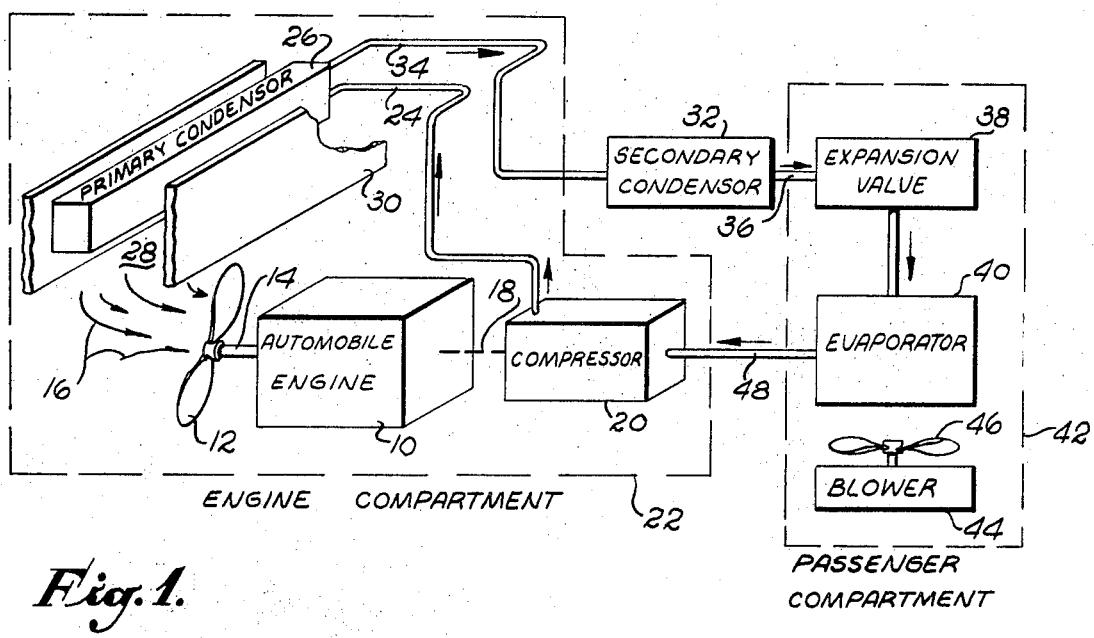
FIG. 1 is a perspective and diagrammatic view of an air conditioning system incorporating the present invention.

Referring initially to FIG. 1, an automobile engine 10 is represented as a diagrammatic block. In accordance with conventional arrangements, the automobile engine 10 includes a radial blade fan 12 which is shown separate from the block 10 and, which is carried on a rotary shaft 14 that is coupled to be driven by the engine 10. In accordance with widespread conventional arrangements, the fan 12 drawn an airstream (indicated by arrows 16) which stream is supplied to the engine 10 for cooling purposes.

In the system as shown in FIG. 1, the engine 10 is mechanically coupled (indicated by the dashed line 18) to drive a rotary compressor 20, various forms of which are well known in the prior art. Specifically, for example, the compressor 20 may take a form as shown and described in U.S. Pat. No. 3,010,644 issued in 1961 to R.C. Zeidler.

The compressor 20 is physically located contiguous to the automobile engine 10 and such relative location is indicated by a dashed block 22 defining the engine compartment of the automobile incorporating the system hereof and identifying those components of the system that are contained therein.

The compressor 20 provides fluid refrigerant from its high side, through a duct 24 to a primary condenser 26. The condenser 26 is positioned in an air passage 28 which is indicated to be defined by a housing 30. It is important to recognize that the air passage 28 is defined at a position which is radially displaced from the rotary pattern of the fan 12. That is, the air passage 28 is somewhat perpendicular to the axis of rotation of the fan 12 and is offset from the cylinder that would be defined by axially extending the circle traversed by the tips of the fan 12.

The primary condenser 30 supplies refrigerant which is received through the duct 24 to a secondary condenser 32 through a duct 34. The secondary condenser 32 has a substantially greater capacity than the primary condenser 26 and in fact, the secondary condenser is to have a heat exchange capability greater than the capability of the primary condenser 26 by a factor of at least three.

The output from the secondary condenser 32 is through a duct 36 to an expansion valve 38 which releases fluid to an evaporator 40 as well known in the prior art. The evaporator 40 along with the expansion valve 38 is located within the passenger compartment 42 of the automobile depicted, as indicated in the drawing. A blower 44 is also located in the passenger compartment 42 including a fan 46, for circulating air over the evaporator 40 so as to cool the interior of the passenger compartment 42.

The refrigerant leaving the evaporator 40 is returned to the low side of the compressor 20 through a duct 48. Recapitulating, the primary condenser 26 along with the compressor 20 and, of course, the engine 10 are located in the engine compartment of the automobile incorporating an air conditioning system in accordance herewith. The expansion valve 38, the evaporator 40 and the blower 44 are physically located in the passenger compartment 42 of the automobile. The secondary condenser 32 is located neither in the engine compartment 22 nor the passenger compartment 42 but rather is mounted outside the automobile so as to be exposed to ambient-temperature air. Generally, the condenser 32 will be mounted on the undercarriage of the automobile or on the roof in the event aesthetic considerations are satisfied by such an installation. Normally, the air temperatures to which the secondary condenser 32 is subjected are somewhat lower than those encountered at most locations in the engine compartment which could accommodate the condenser.

In general, the operation of the air conditioning system as depicted in FIG. 1 simply involves an evaporation-condensation refrigeration cycle whereby fluid refrigerant is compressed by the compressor 20, reduced to a fluid by the condensers 28 and 32, then permitted to expand into a gaseous form through the valve 38 into the evaporator 48 which is cooled as a result and which in turn cools a stream of air provided by the blower 44. In that manner, the interior of the automobile is cooled to approach or attain the desired temperature.

Completing the consideration of the refrigeration cycle, refrigerant is drawn from the evaporator 40 to the duct 48 by the compressor 20 for recycling. Of course, the basic refrigeration cycle as described above is well known in the prior art and has been widely practiced for many years. However, in the improved system of FIG. 1, effective refrigeration or cooling of the passenger compartment 42 is provided without substantially interfering with the operation of the automobile engine 10 as for example by increasing the temperature thereof to an intolerable level.

The effective operation of the present system results from the combination arrangement of a relatively small primary condenser positioned in a radially displaced stream of air provided to the fan 12 in combination with a substantially larger condenser 32 mounted on the outside of the automobile and out of the engine compartment 22 in which air is usually at a temperature substantially increased over ambient levels. Thus, it has been determined that by positioning the smaller primary condenser 28 as indicated, and the larger secondary condenser 32, on the exterior of the vehicle, and further providing a somewhat-critical size relationship between these condensers, a considerable improvement is attained.

Although the structural details of the primary condenser 26 and the secondary condenser 32 may vary widely, the critical size relationship between the two is to be preserved. Furthermore, forms of these condensers have been successfully utilized which are described in detail below and which function effectively in the system as described above.

Figure 2:
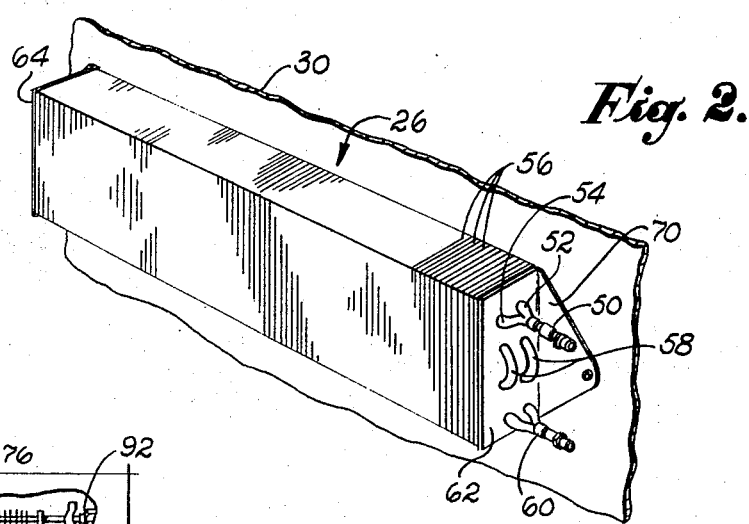
FIG. 2 is a perspective view of one component of the system of FIG. 1.

Specifically, referring to FIG. 2, there is shown an effective structural form of the primary condenser 26 for use herein. The components of the condenser 26 are basically aluminum fins deposed upon copper tubing. Specifically, an inlet coupling 50 is connected to receive refrigerant from the compressor 20 and incorporates a junction for splitting the stream of refrigerant into two parallel tubes 52 and 54 which extend the full length of the elongated-form condenser 26 and are folded so as to travel the length of the condenser in four passes.

Spaced-apart along the folded lengths of the tubes 52 and 54 are aluminum fins 56 which are generally rectangular in shape and which may be variously affixed onto the tubes as by solder. In the production of the condenser 26, portions of the tubes 52 and 54 may be formed as U-shapes which can be mated together to provide the structure as shown. By using such a technique, in the manufacture of the condenser, the fins 56 may be slipped over straight terminal ends of the tubes and soldered in place. Then subsequently, when the fins 56 are fixed in position, the open ends of the tubes are interconnected by mating the U-shapes 58 and couplings 50 and 60 to the open ends.

At the ends of the primary condenser 26 a pair of mounting brackets 62 and 64 are provided aligned with the fins, for affixing the primary condenser in the air passage as described with reference to FIG. 1. Specifically, the brackets 62 and 64 simply comprise angular brackets having one portion coinciding in size to the fins 56 and a tapered perpendicular extension 70 defining a bore to receive fasteners 72 to fix the condenser to the housing 30.

Figure 3:
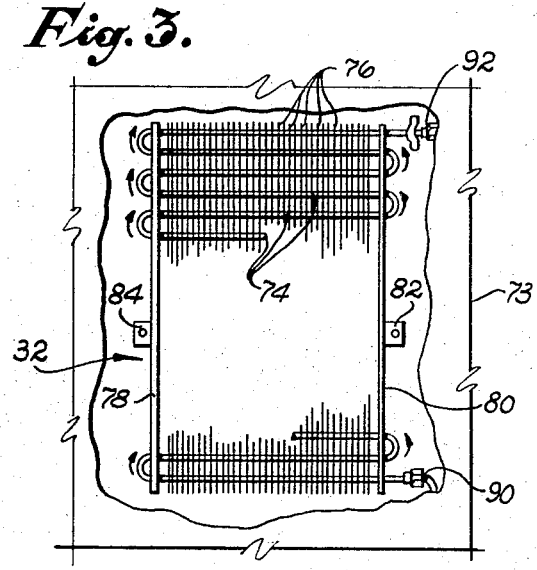
FIG. 3 is a plan view of another component of the system of FIG. 1.

The secondary condenser may also take a variety of different forms and in that regard a form that is somewhat structurally similar to that disclosed above has been utilized, as shown in FIG. 3. In adapting the system for affixing the secondary condenser under the automobile, e.g., to the body 73, it is desirable to provide the secondary condenser 32 in a substantially flat configuration as shown. Accordingly, the condenser 32 includes a plurality of lengths 74 of tubular duct, which are folded in a single plane and which collectively receive radiating fins 76. The condenser 26 accordingly consists of a single duct folded to lie in a single plane to define the several lengths 76, carrying radiating fins 74 and side mounting plates 78 and 80 which are affixed by brackets 82 to to the underside 84 of the automobile.

Accordingly, the secondary flat-configuration condenser as shown in FIG. 4 receives refrigerant through an intake coupling 90 and outlets the refrigerant through a coupling 92. As indicated, the fluid flow path for the refrigerant lies essentially in a single plane with the result that a relatively flat condenser is provided which is adaptable for mounting under the automobile.

Having thus described the system hereof with respect to FIG. 1 and presented further exemplary details thereof with regard to the form of condensers utilized herein, adaptations and modifications thereof will be readily apparent. Accordingly, the scope hereof shall be determined in accordance with the claims set forth.

What is claimed is:

1. An automotive air-conditioning system, of the type utilizing a refrigerant for cooling a passenger space of a automobile, said system being driven by the engine of said automobile which includes a radial-blade fan for circulating air as a coolant, said system comprising:
   a compressor means connected to be driven by said engine and mounted contiguous thereto;
   evaporator means affixed in said passenger space of said automobile;
   blower means for circulating air over said evaporator means;
   means defining an air flow passage extending radially with reference to said fan and lying radially outside the circumferential pattern of said fan;
   first condenser means having an elongated form located in said air flow path to extend substantially perpendicular to the axis of rotation of said fan;
   second condenser means having a flat configuration and located remote from said engine at the underside of said automobile, said second condenser means having a substantially greater heat exchange capability than said first condenser; and
   duct means for coupling said refrigerant to flow cyclically through said compressor, said first condenser means, said second condenser means and said evaporator means and then back to said compressor means.

2. An automotive air-conditioning system according to claim 1 wherein said second condenser has a heat exchange capability greater than the heat exchange capability of said first condenser means by a factor of at least 3.

* * * * *